July 12, 1927.

J. R. PULLEN ET AL 1,635,387

MERRY-GO-ROUND

Filed July 2, 1923

Inventors:
Joseph R Pullen
William L. Fiene

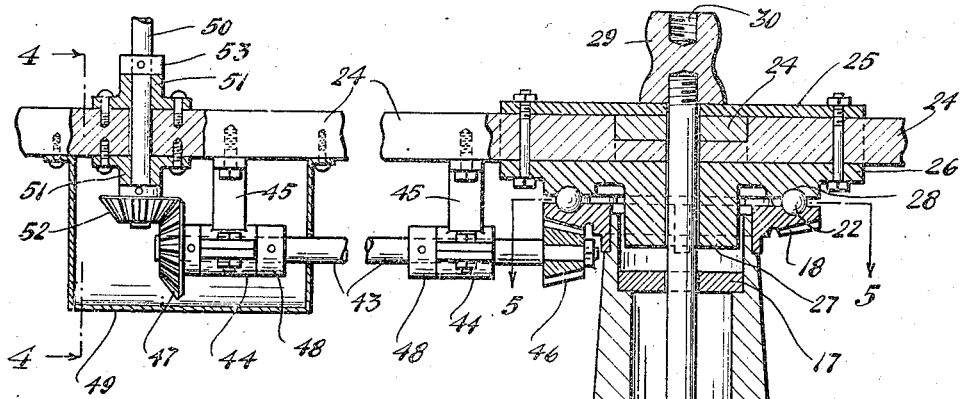
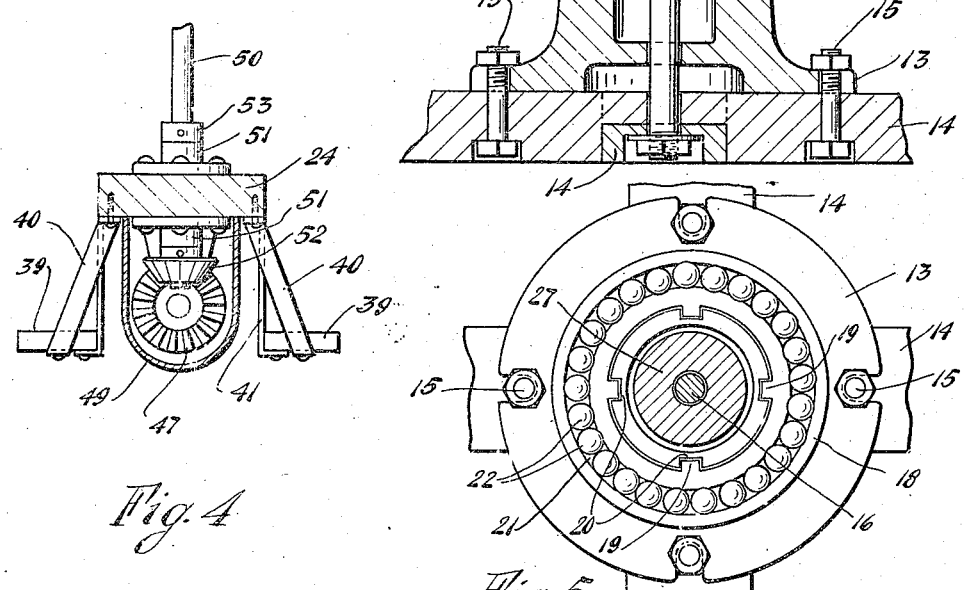

July 12, 1927.
J. R. PULLEN ET AL
1,635,387
MERRY-GO-ROUND
Filed July 2, 1923
3 Sheets-Sheet 3
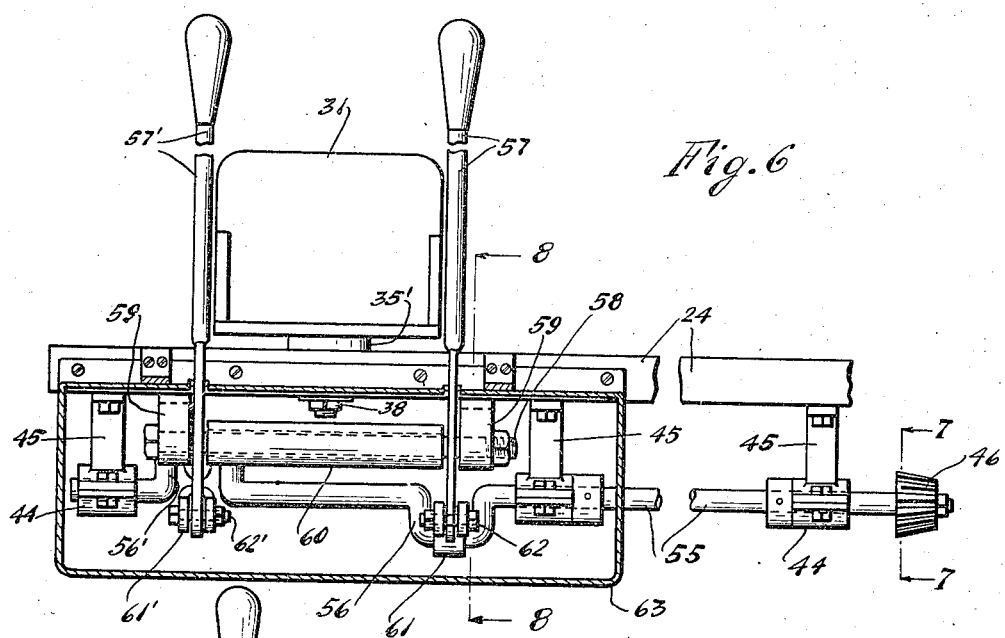
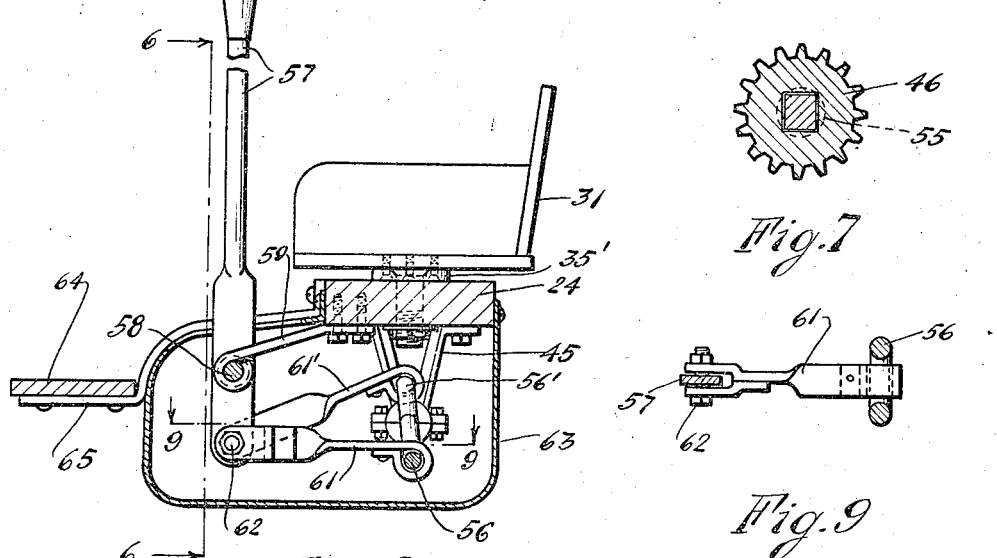
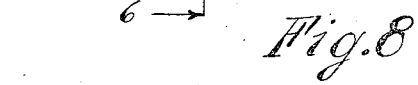
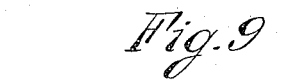

Patented July 12, 1927.

1,635,387

UNITED STATES PATENT OFFICE.

JOSEPH R. PULLEN, OF CHICAGO, AND WILLIAM L. FIENE, OF ELMHURST, ILLINOIS.

MERRY-GO-ROUND.

Application filed July 2, 1923. Serial No. 649,126.

Our invention relates to a merry-go-round, and has for its main object to provide such an apparatus with driving means which can be operated manually by the passengers from the passenger carrying or seating means, for rotating the merry-go-round; thereby avoiding the necessity of a motor or other power driving means, and reducing the cost of production and operation.

Other objects and advantages will appear from the following description taken in connection with the drawings, in which, Fig. 1 is a top plan view of the invention;

Fig. 3 is an enlarged vertical section on line 3—3 on Fig. 1;

Fig. 4 is a vertical detail section on line 4—4 of Fig. 3;

Fig. 5 is a horizontal section on line 5—5 of Fig. 3;

Fig. 6 is a detail section of a modified form of manual means for operating the device, taken on line 6—6 on Fig. 8;

Fig. 7 is a detail section on line 7—7 on Fig. 6;

Fig. 8 is a cross-section on line 8—8 on Fig. 6; and

Fig. 9 is a horizontal detail section on line 9—9 on Fig. 8.

Figure 1:
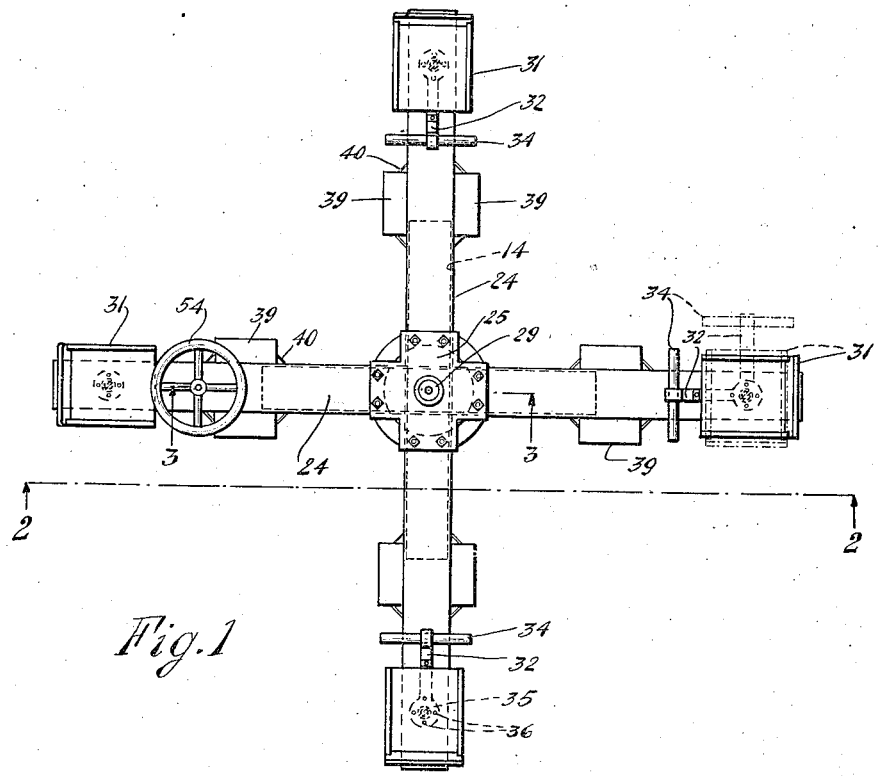

The form in which we have illustrated our invention comprises in general a stationary support with a frame rotatably mounted thereon, and passenger carrying or seating means on said frame, with operating or propelling means adjacent said seating means which is operable manually by passengers located on said seating means for rotating said frame.

The supporting means may be arranged and constructed in any approved form or manner, but preferably comprises a pedestal 12 of strong wood or metal or similar suitable material, which is provided with a laterally extending bottom flange 13, fastened on a supporting base 14 by means of suitable bolts 15 and by a shaft 16 extending centrally through said pedestal and through a bearing collar 17 mounted in the upper end of said pedestal. The base may be formed of intersecting members as shown or otherwise and can be anchored to the ground or floor in any suitable manner, and the pedestal is also adapted to be mounted directly on the floor by means of its bottom flange 13 and shaft 16, if preferred. A gear 18 is fastened to the upper end of said pedestal by means of lugs 19 and slots 20, or the like, and a ball-race 21 with balls or similar anti-friction bearings 22 is provided on the upper face of said gear.

The rotatable frame may be made in any suitable form, though we have shown it and prefer to provide it with radially extending arms or beams 24 which are joined or intersected at the center of the frame and are held properly spaced and re-inforced at such center by means of a top plate 25 and a bottom bearing member 26 which is provided with a central hub 27 fitting in a suitable bore in the upper end of the pedestal 12, and with a ball-race 28 which corresponds to the ball-race 21 on gear 18 and rotates on the balls 22. Suitable bolts or similar means are used to fasten and retain said members 24, 25 and 26 together in proper position; and a knob 29 is fastened on the top of shaft 16 which extends from the frame, to hold the member 26 and the supported frame in proper position to rotate freely on said anti-friction bearings 22, a threaded socket 30 being provided on the top of said knob for the insertion of the pole of a canopy top or similar protecting means.

The frame is provided with passenger carrying means or seating means 31 which may include one or more of the different types or kinds of objects or means generally used on merry-go-rounds for carrying passengers and which we have shown in the form of a seat, one of said passenger carrying means being preferably placed adjacent the outer end of each arm or beam 24. The seats are provided with hand supporting means which preferably consist of a bar 32 extending forwardly from the seat and then upwardly, a brace bar 33 reinforcing the curved portion, and a handle bar 34 being placed in an eye formed at the top of said bar. The lower end of said bar is preferably provided with an enlarged bearing portion 35 with which it is fastened beneath the seat as by means of screws 36, and a bolt 37 is mounted in said bearing portion 35 before it is fastened to said seat and in such a manner as to prevent rotation therein, said bolt passing through beam 24 and with a suitable washer and nut 38 enabling said seat with the hand supporting means to be faced or adjusted in any suitable position or direction on said beam, and then to be fastened and firmly held in such position. Means for resting and supporting the feet is provided adjacent each seat, and may consist of a pair of footboards 39 mounted below the beam 24 by means of a pair of diagonal straps 40 connecting the ends of each board with said beam, and a depending strap 41 connecting the inner side of the board with said beam, or said foot rests may be arranged in some other suitable manner.

Figure 2:
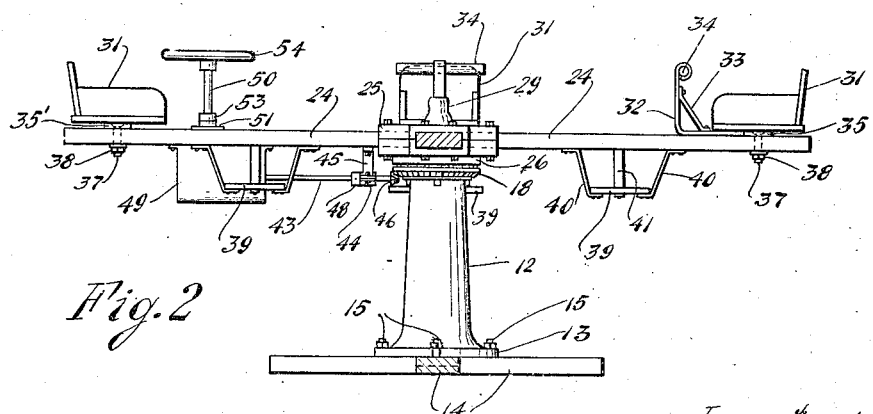
Fig. 2 is an elevation thereof, partly in section, taken on line 2—2 on Fig. 1.

We provide manual operating means adjacent one or more of said passenger carrying or seating means, and which is operable by passengers from said seating means for rotating the frame on the pedestal. We provide this manual operating means in various forms, one form being shown in Figs. 1 to 4, and another form being shown in Figs. 6 to 9.

The form of manual operating means illustrated in Figs. 1 to 4 comprises a driving shaft 43 mounted to rotate in bearings 44 on brackets 45 fastened beneath the beam 24 by suitable bolts, and a pinion 46 is fastened on one end of said shaft 43 to rotate therewith and engages gear 18, while a pinion 47 is fastened on the other end of said shaft, suitable collars 48 being fastened on the shaft adjacent said bearings to prevent said shaft and pinions from shifting axially. A casing 49 is mounted beneath said beam, enclosing pinion 47 and the adjacent bearing and collars, and a shaft 50 extends through said beam and through bushings 51 fastened on each side of said beam, a pinion 52 being fastened to the lower end of the shaft and engaging pinion 47, while a collar 53 fastened on the shaft bears on the upper bushing 51 to support said shaft vertically. A hand wheel 54 or similar hand engageable means is fastened on the upper part of said shaft 50 and is operable or rotatable by a passenger from the adjacent seat for actuating shafts 50 and 43 and forcing pinion 46 to travel around gear 18 and thus rotate the frame, the operator's seat 31 being mounted on the beam with a disk 35' fixed to the seat and a bolt 37 and nut 38 as on the other seats.

Another form of operating means is shown in Figs. 6 to 9, which is also operated by hand by a passenger from the adjacent seat 31' which is mounted on beam 24, like the operator's seat in the preceding form, with a disk 35' and a bolt 37 and nut 38; but instead of a straight driving shaft, a crank shaft 55 with two cranks 56 and 56' is mounted to rotate in bearings 44 on brackets 45 bolted under beam 24, and a pinion 46 is fastened on the end of this shaft to rotate therewith (see Figs. 3 and 7) and engages gear 18, as described above in connection with the preceding form. Handles 57 and 57' are pivotally mounted on a bolt 58 fastened in brackets 59 which are bolted beneath said beam, said handles being spaced by a bushing 60 on said bolt 58 and being connected to said cranks 56 and 56' by means of links 61 and 61' engaging said cranks and engaging bolts 62 and 62' in the lower end of said levers. A casing 63 encloses said cranks and links, the levers extending through slots in the top, and a foot rest or board 64 is mounted forward of said casing on brackets 65 fastened to the beam.

The manual operating means has been shown as hand operated means in the two forms of our invention illustrated, but foot operated means may equally as well be substituted and used in place thereof.

It is apparent from the above disclosure that we have provided a merry-go-round which is conveniently operated by passengers on the rotatable frame, and thus does away with the usual motor or power driving means, and greatly reduces the cost of production and operation.

What we claim as our invention and desire to secure by Letters Patent is:

A merry-go-round comprising a stationary pedestal, a frame on said pedestal with a ball race on its under face, said frame including a radially extending beam, a gear fixed at the upper end of said pedestal and provided with a ball race on its upper face to correspond to the first said ball race and having antifriction bearings therein for rotatably mounting said frame with said bearings upon said gear, brackets beneath said beam, a shaft journaled in said brackets and having a pinion engaging said gear beneath said frame, a seat at the outer end of said beam, and crank means and hand levers thereon, mounted on said beam, at each side of said seat, and actuated by both hands or either hand from said seat for operating said shaft and rotating said frame on said pedestal.

In testimony whereof we have signed our names.

JOSEPH R. PULLEN.
WILLIAM L. FIENE.